(12) United States Patent
Yamasaki

(10) Patent No.: US 11,190,660 B2
(45) Date of Patent: Nov. 30, 2021

(54) IMAGE READING APPARATUS AND IMAGE FORMING APPARATUS

(71) Applicant: CANON KABUSHIKI KAISHA, Tokyo (JP)

(72) Inventor: Shogo Yamasaki, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/893,822

(22) Filed: Jun. 5, 2020

(65) Prior Publication Data

US 2021/0014361 A1    Jan. 14, 2021

(30) Foreign Application Priority Data

Jul. 11, 2019    (JP) .............................. JP2019-128945

(51) Int. Cl.
*H04N 1/00*    (2006.01)
*H04N 1/10*    (2006.01)

(52) U.S. Cl.
CPC ....... *H04N 1/0083* (2013.01); *H04N 1/00557* (2013.01); *H04N 1/1026* (2013.01)

(58) Field of Classification Search
CPC . H04N 1/0083; H04N 1/00557; H04N 1/1026
See application file for complete search history.

(56) References Cited

U.S. PATENT DOCUMENTS

| 9,420,142 | B2 | 8/2016 | Imoto et al. ......... | H04N 1/1026 |
| 2008/0068679 | A1* | 3/2008 | Murai ................ | H04N 1/00559 |
| | | | | 358/497 |

(Continued)

FOREIGN PATENT DOCUMENTS

JP    2018-014763    1/2018

*Primary Examiner* — Ibrahim Siddo
(74) *Attorney, Agent, or Firm* — Venable LLP

(57) ABSTRACT

An image reading apparatus includes
a housing;
a transparent plate that is provided in an opening formed in an upper part of the housing and on which an original is placed;
an image reading unit that is disposed inside the housing and that scans in a main scanning direction while moving in a sub-scanning direction to read an image of the original placed on the transparent plate;
a flexible flat cable having one end that is connected to a control board on which an electronic component that is configured to process the image read by the image reading unit is mounted and the other end that is connected to the image reading unit, the flexible flat cable being configured to electrically connect the image reading unit and the control board, the flexible flat cable being disposed such that a width direction of the flexible flat cable crosses a surface of the transparent plate, the flexible flat cable being partially fixed to a side wall of the housing facing the image reading unit in the main scanning direction; and
a holding portion configured to hold a part of the flexible flat cable, the holding portion holding the part between a part fixed to the side wall and the other end, of the flexible flat cable, the holding portion being formed on an end face of the image reading unit in the sub-scanning direction, wherein
the holding portion holds the flexible flat cable such that a distance in the main scanning direction between a position at which the holding portion holds a lower end of the flexible flat cable in the width direction and the side wall is longer than a distance in the main scanning direction between a position at which the holding portion holds an upper end of the flexible flat cable in the width direction and the side wall.

6 Claims, 13 Drawing Sheets

(56) References Cited

U.S. PATENT DOCUMENTS

2014/0376068 A1    12/2014  Imoto et al.  ......... H04N 1/1026
2019/0260893 A1*   8/2019   Imoto ................. H04N 1/0083

* cited by examiner

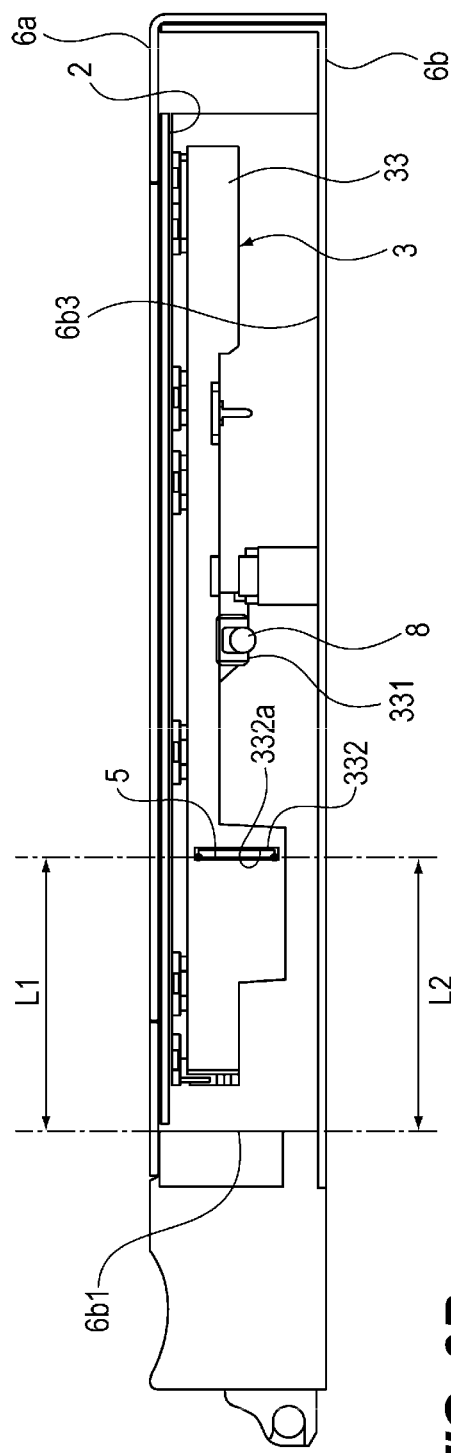
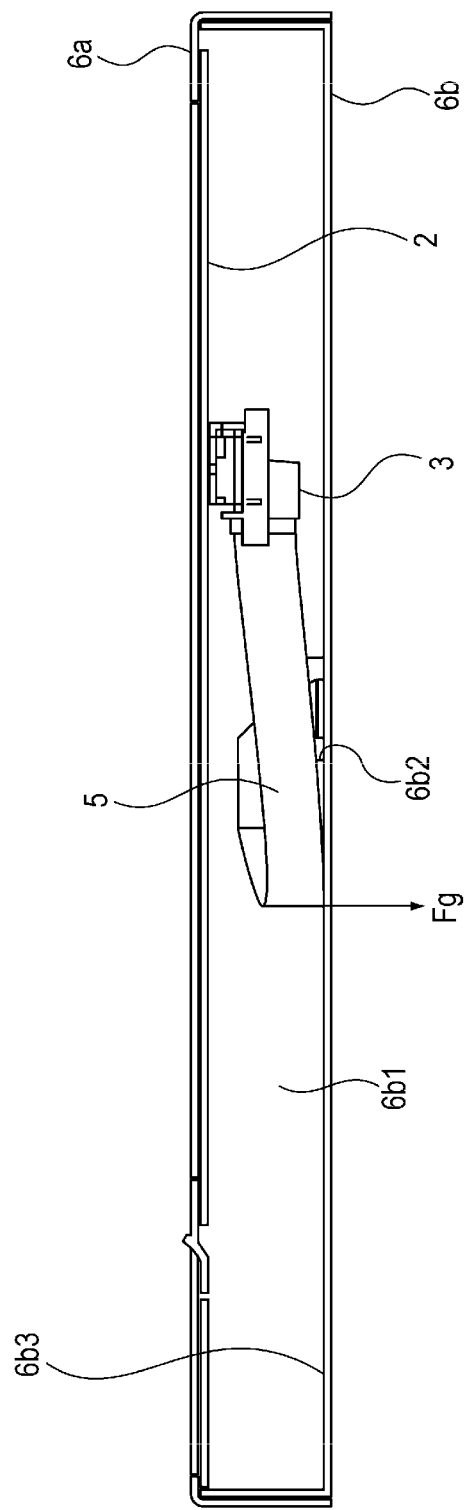
FIG. 9A
FIG. 9B

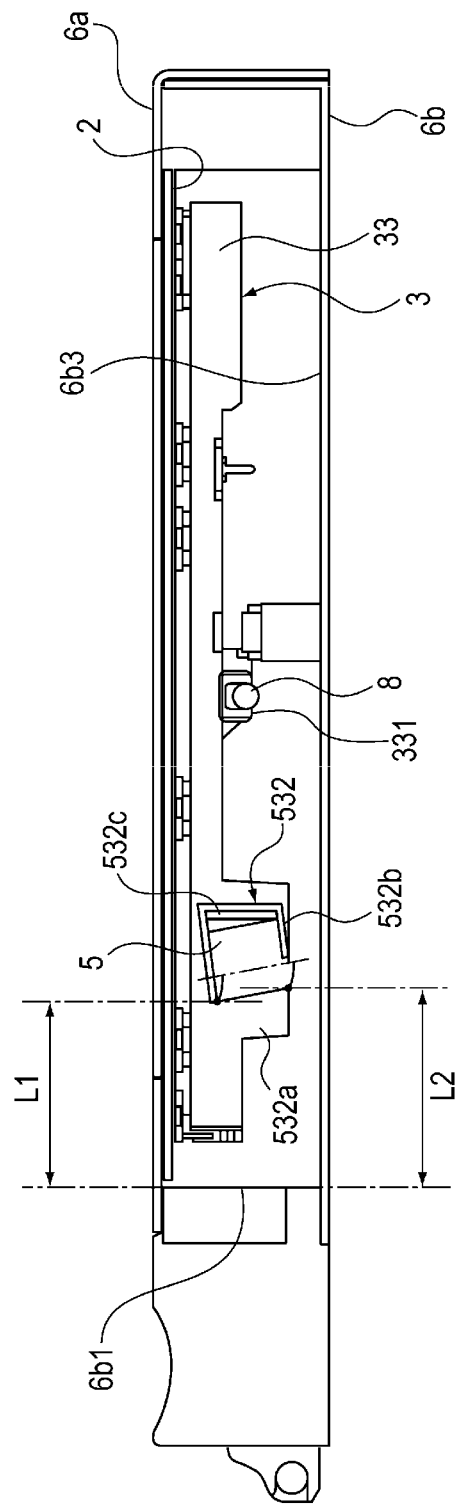
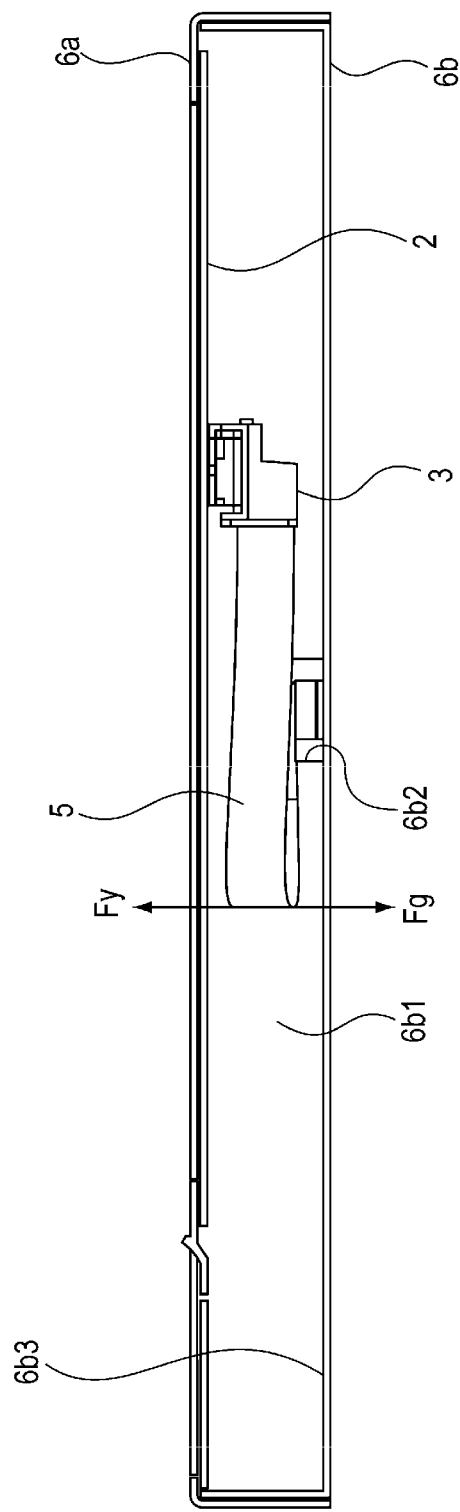
FIG. 13A
FIG. 13B

IMAGE READING APPARATUS AND IMAGE FORMING APPARATUS

BACKGROUND OF THE INVENTION

Field of the Invention

The present invention relates to an image reading apparatus suitable for an image forming apparatus such as an electrophotographic copying machine and a laser beam printer that forms an image on a recording medium using an electrophotographic process.

Description of the Related Art

In a flatbed type image reading apparatus, an image of an original placed on an original base plate glass is read by an image reading unit. The image reading unit includes a light emitting element and a light receiving element, and irradiates the original with light from the light emitting element, receives the reflected light by the light receiving element, converts the light into an electric signal, and performs scanning in the main scanning direction. The image reading unit continuously scans in the main scanning direction while moving in the sub-scanning direction along the original base plate glass, thereby reading an image of an original placed on the original base plate glass.

The electric signal output from the image reading unit is transmitted via a flexible flat cable (hereinafter, also referred to as a "cable") to a control board on which electronic components that are configured to process an image are mounted. Here, Japanese Patent Laid-Open No. 2018-14763 describes a configuration in which an upper side restricting portion that contacts the cable from above and restricts the upward movement of the cable, and a lower side restricting portion that contacts the cable from below and restricts the downward movement of the cable are provided for the image reading unit. With the configuration, the image reading unit holds the cable, the vertical movement of the cable around the image reading unit is restricted, and the contact between the cable and the members around the image reading unit is suppressed.

In the configuration described in Japanese Patent Laid-Open No. 2018-14763, part of the cable is fixed to the side wall, of the housing of the image reading apparatus, which is a side wall facing the image reading unit in the main scanning direction of the image reading unit. In a case where the image reading unit moves in the sub-scanning direction, when the image reading unit approaches a part, of the side wall of the housing, to which the cable is fixed, the tension of a part between a part, of the cable, which is fixed to the side wall of the housing and a part, of the cable, which is held by the image reading unit is small.

When the cable tension is small like this, the cable may bends, and its curved portion may hang down due to its own weight and come into contact with the bottom face of the housing of the image reading apparatus or other members. In this case, the cable may be worn due to sliding friction between the cable and the housing or other members, which may cause disconnection of the cable or malfunction of the image reading unit.

SUMMARY OF THE INVENTION

The object of the present invention is to provide an image reading apparatus capable of suppressing hanging down of a flexible flat cable connecting an image reading unit and a control board.

In a typical configuration of the present invention, an image reading apparatus includes a housing; a transparent plate that is provided in an opening formed in an upper part of the housing and on which an original is placed; an image reading unit that is disposed inside the housing and that scans in a main scanning direction while moving in a sub-scanning direction to read an image of the original placed on the transparent plate; a flexible flat cable having one end that is connected to a control board on which an electronic component that is configured to process the image read by the image reading unit is mounted and the other end that is connected to the image reading unit, the flexible flat cable being configured to electrically connect the image reading unit and the control board, the flexible flat cable being disposed such that a width direction of the flexible flat cable crosses a surface of the transparent plate on which the original is placed, the flexible flat cable being partially fixed to a side wall of the housing facing the image reading unit in the main scanning direction; and a holding portion configured to hold a part of the flexible flat cable, the holding portion holding the part between a part fixed to the side wall and the other end, of the flexible flat cable, the holding portion being formed on an end face of the image reading unit in the sub-scanning direction, wherein the holding portion holds the flexible flat cable such that a distance in the main scanning direction between a position at which the holding portion holds a lower end of the flexible flat cable in the width direction and the side wall is longer than a distance in the main scanning direction between a position at which the holding portion holds an upper end of the flexible flat cable in the width direction and the side wall.

Further features of the present invention will become apparent from the following description of exemplary embodiments with reference to the attached drawings.

BRIEF DESCRIPTION OF THE DRAWINGS

FIGS. 9A and 9B are sectional views of the reader according to a comparative example;

FIGS. 13A and 13B are sectional views of the reader.

DESCRIPTION OF THE EMBODIMENTS

First Embodiment

<Image Forming Apparatus>

Hereinafter, an overall configuration of an image forming apparatus including an image reading apparatus according to a first embodiment of the present invention will be described with reference to the drawings together with an operation at the time of image formation. Note that dimensions, materials, shapes, relative dispositions, and the like of the components described below are not intended to limit the scope of the present invention unless otherwise specified.

An image forming apparatus A according to the embodiment is an intermediate tandem system image forming apparatus in which an image is transferred and formed onto a sheet after toners of four colors of yellow Y, magenta M, cyan C, and black K are transferred onto an intermediate transfer belt. In the following description, while Y, M, C, and K are added as subscripts to members using the toner of each color described above, configurations or operations of the members are substantially the same except that colors of the toner are different from each other. Therefore, the subscripts are omitted as appropriate unless distinction is required.

Figure 1:
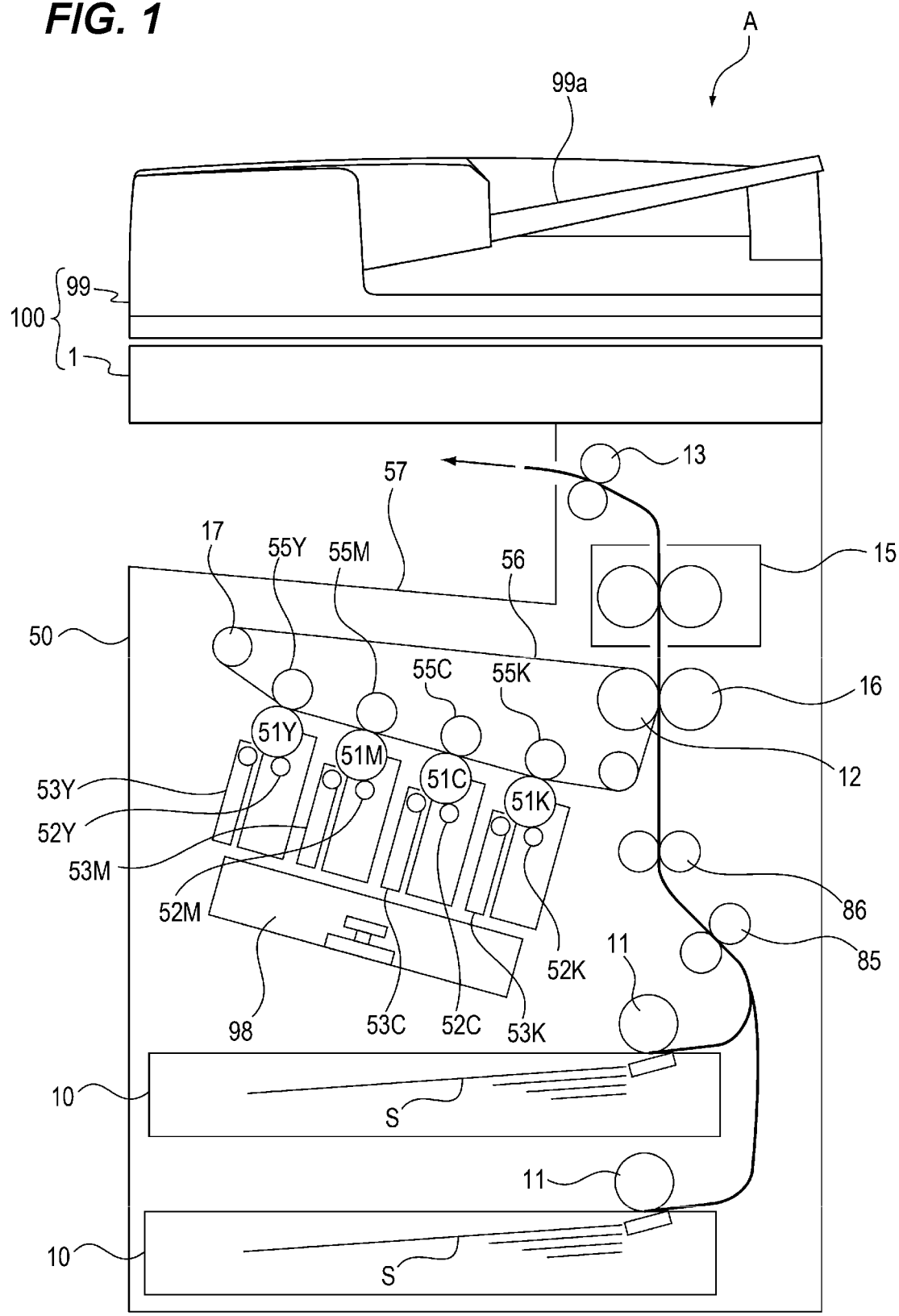
FIG. 1 is a schematic sectional view of an image forming apparatus.

FIG. 1 is a schematic sectional view of an image forming apparatus A. As shown in FIG. 1, an image reading portion 100 that reads an image of an original is provided on the upper part of the image forming apparatus A. The image reading portion 100 includes a reader 1 and an ADF 99. The ADF 99 is rotatably supported by a hinge (not shown) with respect to the reader 1, and can access an original base plate glass 2 of the reader 1 by rotating the ADF 99 to open it upward.

When reading an original image with the ADF 99, the user stacks the originals on an original tray 99a, and issues an instruction to read the original via the operation portion (not shown), so that the ADF 99 reads the original image while automatically feeding the original. When reading the image of the original with reader 1, the user places the original on the original base plate glass 2, and issues an instruction to read the original via the operation portion (not shown), so that the reader 1 reads the original image. The detailed configuration of the reader 1 will be described later.

Further, an image forming apparatus A includes an image forming portion that transfers a toner image to the sheet S to form an image. The image forming portion includes photosensitive drums 51 (51Y, 51M, 51C, 51K), charging rollers 52 (52Y, 52M, 52C, 52K), and developing devices 53 (53Y, 53M, 53C, 53K). Further, it includes primary transfer rollers 55 (55Y, 55M, 55C, 55K), a laser scanner unit 98, an intermediate transfer belt 56, a secondary transfer roller 16, a secondary transfer counter roller 12, a driving roller 17, and the like.

A controller board (not shown) is attached to the frame on the back side of an apparatus main body 50 of the image forming apparatus A, where the frame supports the photosensitive drums 51. The controller board is an electronic board for performing various controls such as image processing, communication with an external device, and control of a power supply board (not shown). In this controller board, image processing of converting the image of the original read by the image reading portion 100 into image data, and image processing of generating image data based on an image input from an external device are performed. The image processing includes a process of converting RGB to YMCK, a density correction process, a magnification correction process, a color shift correction process, and the like.

Next, an image forming operation by the image forming apparatus A will be described. When an image is formed, first, an image forming job signal is input to the controller board. As a result, a feed roller 11 and a conveying roller 85 rotate, and the sheets S stacked and stored in a sheet cassette 10 are sent out to a registration roller 86. Next, the sheet S is sent by a registration roller 86 to a secondary transfer portion formed by the secondary transfer roller 16 and the secondary transfer counter roller 12 at a predetermined timing.

On the other hand, in the image forming portion, first, the surface of the photosensitive drum 51Y is charged by the charging roller 52Y. After that, the laser scanner unit 98 irradiates the surface of the photosensitive drum 51Y with laser light in accordance with the image signal of the image of the original read by the image reading portion 100 to form an electrostatic latent image on the surface of the photosensitive drum 51Y. After that, yellow toner is attached to the electrostatic latent image formed on the surface of the photosensitive drum 51Y by the developing device 53Y to form a yellow toner image on the surface of the photosensitive drum 51Y. The toner image formed on the surface of the photosensitive drum 51Y is primarily transferred to the intermediate transfer belt 56 by applying a primary transfer bias to the primary transfer roller 55Y.

By the same process, magenta, cyan, and black toner images are formed on the photosensitive drums 51M, 51C, and 51K. Then, by applying a primary transfer bias to the primary transfer rollers 55M, 55C, and 55K, these toner images are transferred in a superposed manner on the yellow toner image on the intermediate transfer belt 56. As a result, a full-color toner image corresponding to the image signal is formed on the surface of the intermediate transfer belt 56.

After that, the intermediate transfer belt 56 moves circularly by the driving force transmitted from the driving roller 17, so that the full-color toner image is sent to the secondary transfer portion. In the secondary transfer portion, a secondary transfer bias is applied to the secondary transfer roller 16, whereby the full-color toner image on the intermediate transfer belt 56 is transferred to the sheet S.

Next, the sheet S to which the toner image has been transferred is subjected to a heating and pressing process in a fixing device 15, whereby the toner image on the sheet S is fixed to the sheet S. After that, the sheet S on which the toner image is fixed is discharged to a discharge portion 57 by a discharge roller 13.

<Reader>

Next, the configuration of the reader 1, which is an image reading apparatus, will be described.

Figure 2:
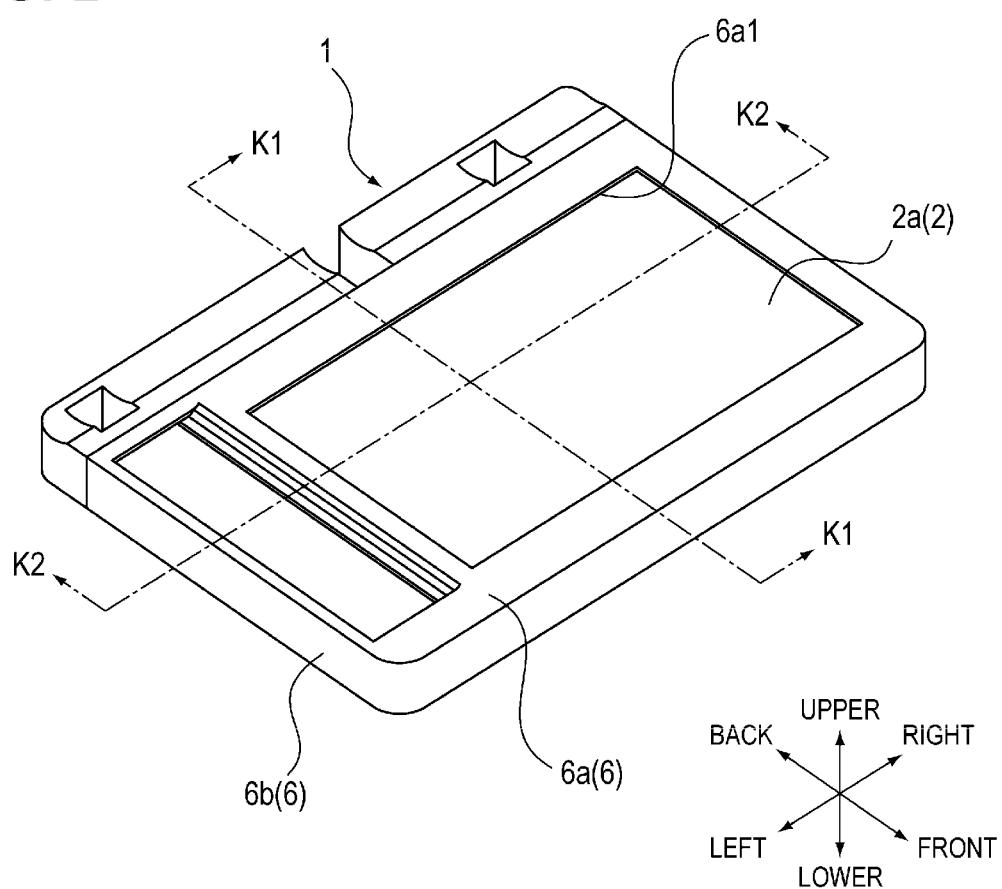
FIG. 2 is a perspective view of a reader.
Figure 3:
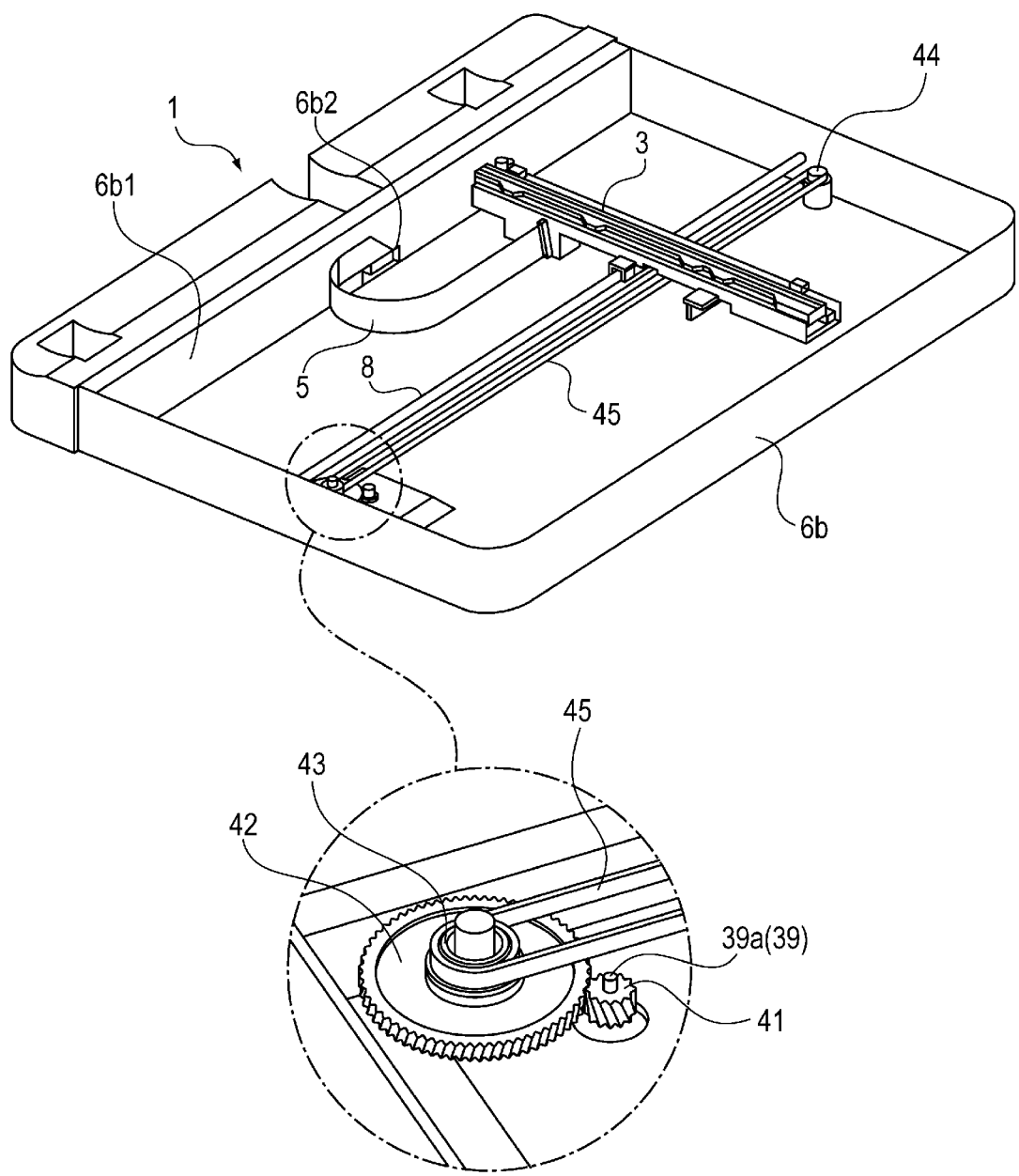
FIG. 3 is a perspective view of the reader with the upper housing removed.
Figure 4:
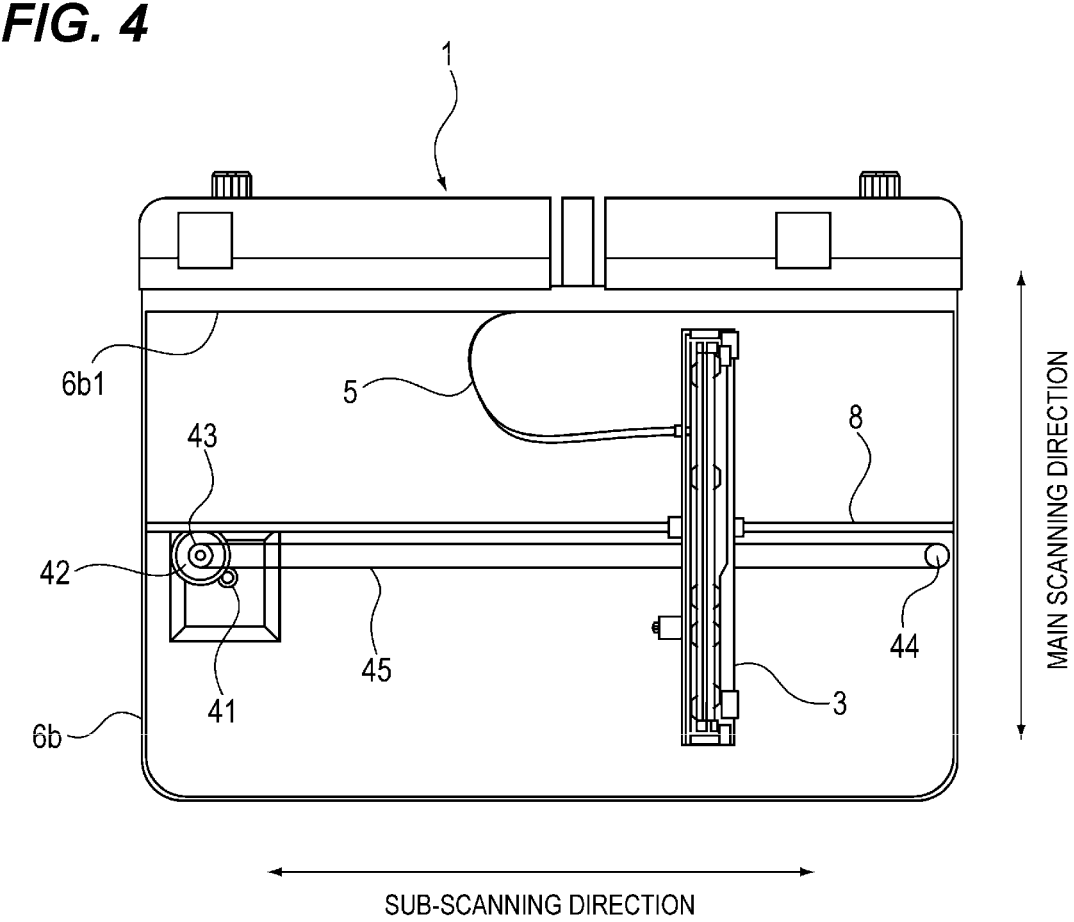
FIG. 4 is a top view of the reader with the upper housing removed.

FIG. 2 is a perspective view of the reader 1. FIGS. 3 and 4 are a perspective view and a top view of the reader 1 in a state where an upper housing 6a which is part of a housing 6 of the reader 1 is removed. As shown in FIGS. 2 to 4, the reader 1 includes a substantially rectangular parallelepiped housing 6 including the upper housing 6a and a lower housing 6b. The upper housing 6a includes an opening 6a1, and the original base plate glass 2 (transparent plate) on which an original is placed is fitted into the opening 6a1. The original base plate glass 2 is a transparent glass plate having a light-transmitting property in a rectangular plate shape larger than the maximum size of the original, and is disposed such that an upper surface 2a on which the original is placed extends in a substantially horizontal direction.

In addition, an image reading unit 3 that reads an image of an original placed on the upper surface 2a of the original base plate glass 2, and a guide shaft 8 extending in the sub-scanning direction of the image reading unit 3 are provided inside the housing 6. Further, a stepping motor 39 and a driving gear 41 attached to a rotation shaft 39a of the stepping motor 39 are provided. Also, a driven gear 42 that meshes with the driving gear 41, a pulley 43 disposed coaxially with the driven gear 42 and rotating integrally with the driven gear 42, a pulley 44 that is paired with the pulley 43 are provided. A rotation belt 45 is suspended between the pulley 43 and the pulley 44.

Figure 5:
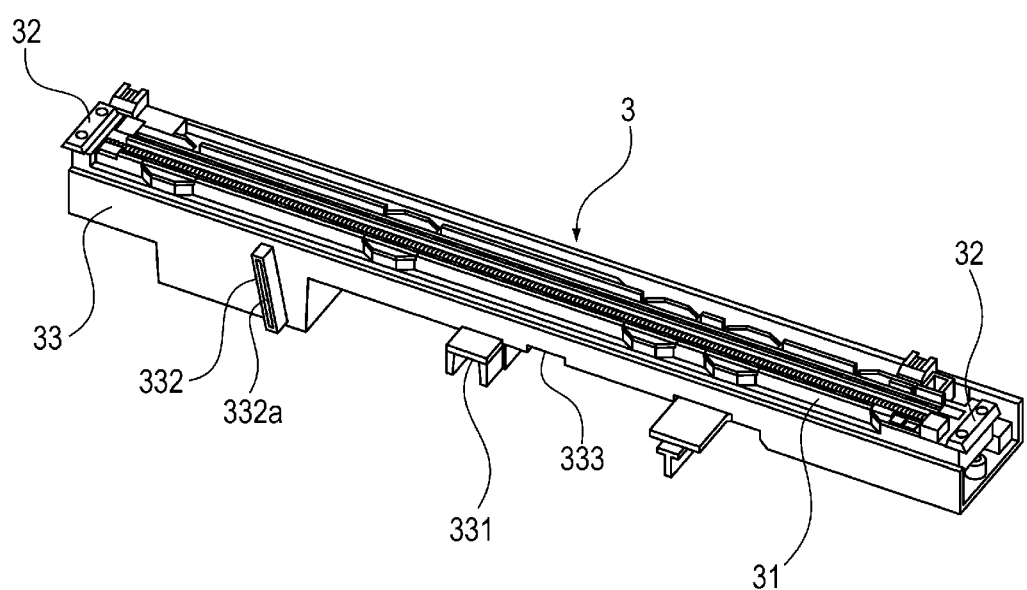
FIG. 5 is a perspective view of an image reading unit.

FIG. 5 is a perspective view of the image reading unit 3. As shown in FIG. 5, the image reading unit 3 includes an image reading sensor 31 and a holder 33 that holds swingably the image reading sensor 31 in the vertical direction. The image reading sensor 31 includes a light emitting element (not shown) that irradiates the original with light, and a light receiving element (not shown) that receives the light reflected from the original and converts it to an electric signal.

The image reading sensor 31 irradiates an original with light from the light emitting element, receives the reflected light from the light receiving element, converts the reflected light into an electric signal, and performs scanning in the main scanning direction. The image reading unit 3 continuously performs scanning in the main scanning direction by the image reading sensor 31 while moving in the sub-scanning direction along the original base plate glass, thereby reading the image of the original placed on the original base plate glass 2. Further, spacers 32 are attached to the upper surfaces of both ends of the image reading sensor 31 in the main scanning direction. The spacer 32 contacts the lower surface of the original base plate glass 2 and keeps the distance between the image reading sensor 31 and the original placed on the original base plate glass 2 constant.

Further, the electric signal generated by the image reading sensor 31 is transmitted to a controller board (not shown) which is a control board provided in the apparatus main body 50 of the image forming apparatus A through a flexible flat cable 5 (hereinafter, referred to as a "cable 5"). Electronic components for controlling the processing of image data of the original and the driving of the stepping motor 39 are mounted on the controller board. Part of the cable 5 is fixed to a side wall 6$b$1, of the lower housing 6$b$, facing the image reading unit 3 in the main scanning direction of the image reading unit 3 with a double-sided tape. Then, it is bent from the fixed part, passes through the opening 6$b$2 of the side wall 6$b$1, is crawled out of the lower housing 6$b$, and is connected to the controller board.

That is, the cable 5 has one end connected to the controller board, the other end connected to the image reading unit 3, and electrically connects the two ends. The cable 5 is connected, via a connector (not shown), to the electronic board (not shown) on which the image reading sensor 31 of the image reading unit 3 is mounted and the controller board. The electronic board on which the image reading sensor 31 is mounted is disposed inside the holder 33.

In the holder 33, a cable holding portion 332 that holds part of the cable 5 is formed on an end face of the image reading unit 3 in the sub-scanning direction. When the cable 5 is inserted into an insertion slot 332$a$ of the cable holding portion 332, the cable 5 enters the holder 33, and the end of the cable 5 is connected to the electronic board on which the image reading sensor 31 is mounted. That is, the cable holding portion 332 holds a part between a part, of the cable 5, fixed to the side wall 6$b$1 and the end, of the cable 5, connected to the image reading unit 3. Also, a part between the part, of the cable 5, fixed to the side wall 6$b$1 and a part, of the cable 5, held by the holder 33 is disposed so that the width direction thereof crosses the upper surface 2$a$ of the original base plate glass 2. Note that the width direction of the cable 5 is a direction orthogonal to the longitudinal direction and the thickness direction of the cable 5, and can also be referred to as the lateral direction of the cable 5.

The holder 33 has a bearing portion 331 loosely fitted to the guide shaft 8 and a connecting portion 333 connected to the rotation belt 45. The rotation belt 45 has a projection portion (not shown), and the projection portion is fitted to the connecting portion 333 to be connected to the connecting portion 333. When the stepping motor 39 is driven, the driving force is transmitted to the rotation belt 45 via the driving gear 41, the driven gear 42, and the pulleys 43 and 44, so that the rotation belt 45 moves circularly. As the rotation belt 45 moves circularly, the image reading unit 3 connected to the rotation belt 45 moves in the sub-scanning direction while being guided by the guide shaft 8.

<Cable Holding Portion>

Next, the configuration of the cable holding portion 332 will be described in detail.

Figure 6A:
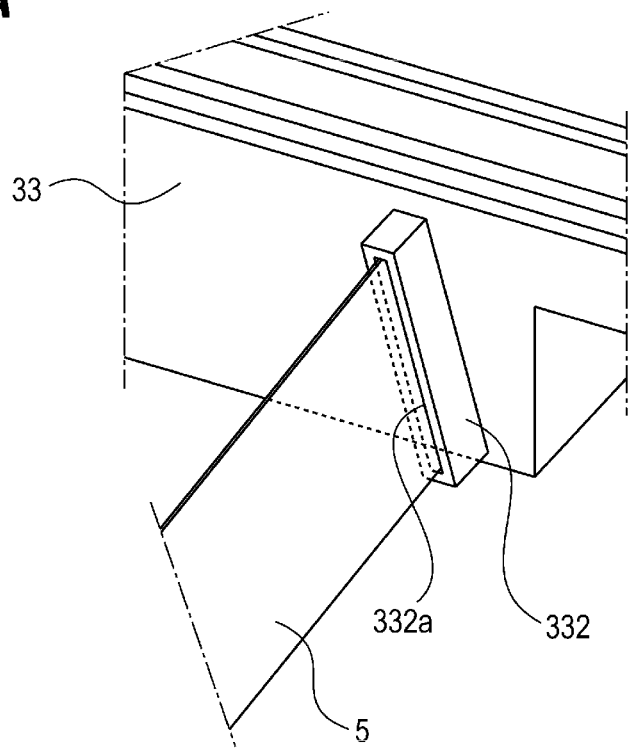
FIGS. 6A and 6B are a perspective view and a front view of a cable holding portion.
Figure 6B:
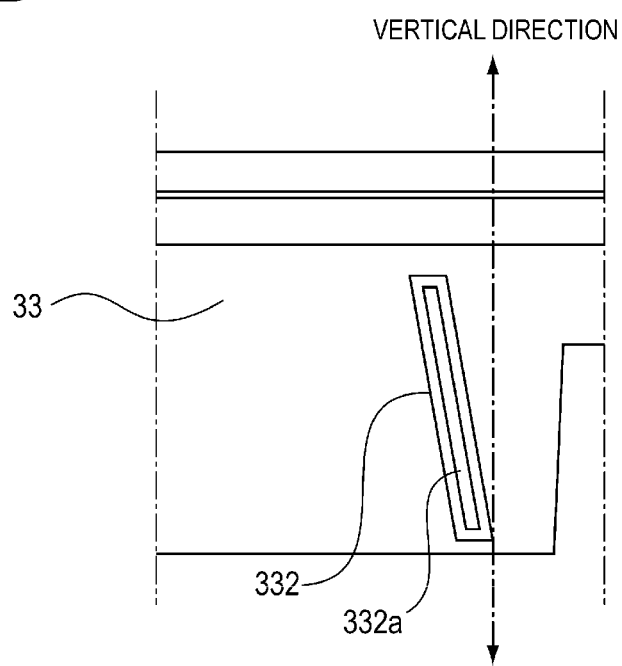

FIG. 6A is a perspective view of the cable holding portion 332. FIG. 6B is a front view of the cable holding portion 332. As shown in FIGS. 6A and 6B, the cable holding portion 332 is formed so as to protrude from the end face of the holder 33 in the sub-scanning direction of the image reading unit 3. The insertion slot 332$a$ of the cable holding portion 332 is inclined in a direction away from the side wall 6$b$1 of the lower housing 6$b$ from the upper end to the lower end in the vertical direction.

Figure 7A:
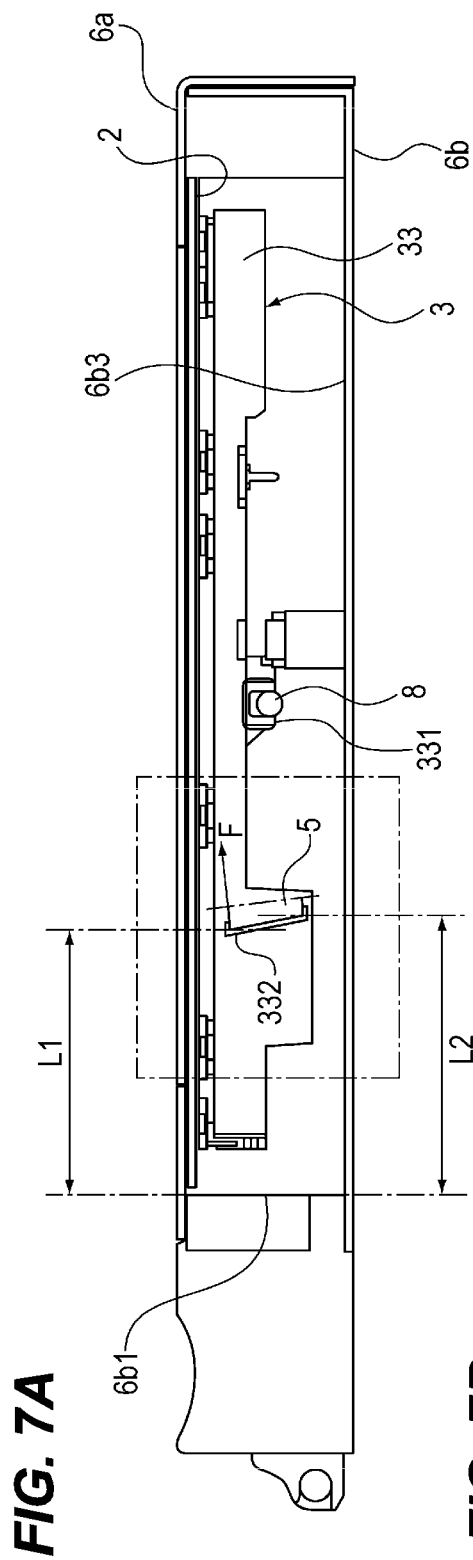
FIGS. 7A and 7B are sectional views of the reader.
Figure 7B:
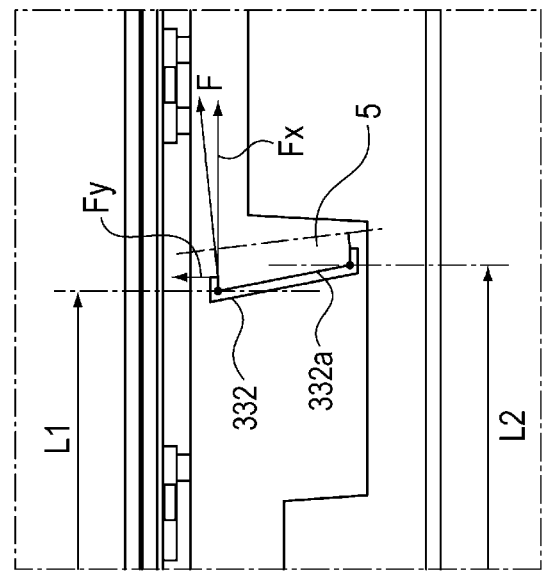
Figure 8:
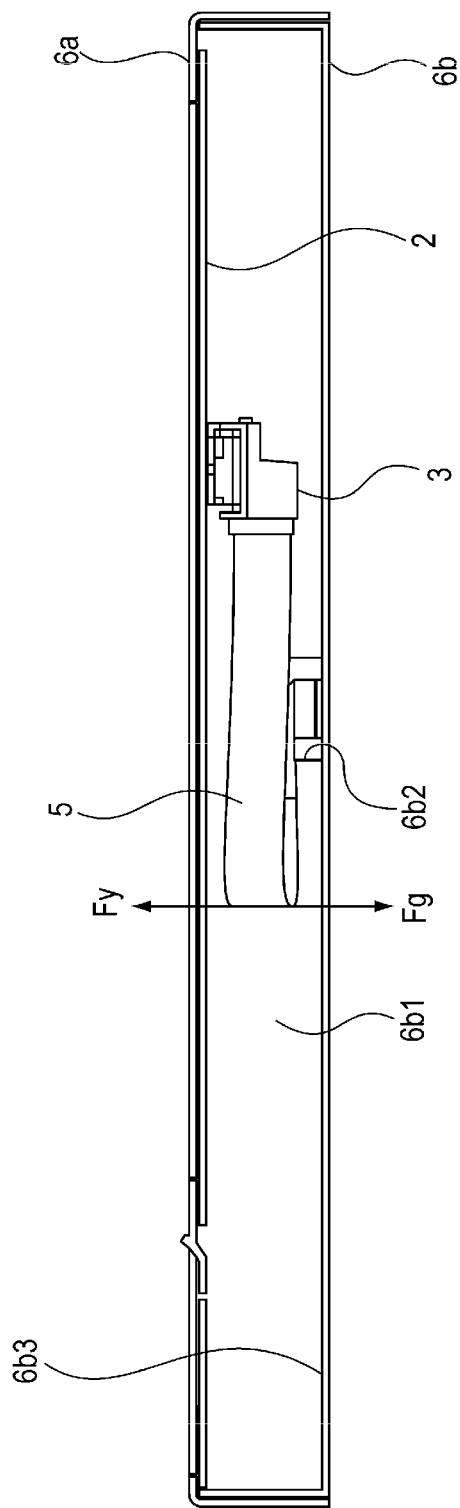
FIG. 8 is a sectional view of the reader.

FIGS. 7A and 7B are sectional views of the reader 1 taken along K1-K1 line shown in FIG. 2. Here, FIG. 7B is an enlarged view of a region surrounded by a dashed line in FIG. 7A. FIG. 8 is a sectional view of the reader 1 taken along K2-K2 line shown in FIG. 2.

As shown in FIG. 7, the distance in the main scanning direction of the image reading unit 3 between a position at which the cable holding portion 332 holds the upper end of the cable 5 in the width direction and the side wall 6$b$1 is set to L1. Further, the distance in the main scanning direction of the image reading unit 3 between a position at which the cable holding portion 332 holds the lower end of the cable 5 in the width direction and the side wall 6$b$1 is set to L2.

At this time, since the insertion slot 332$a$ is inclined as described above with respect to the vertical direction, the cable holding portion 332 holds the cable 5 so that the relationship of L1>L2 is satisfied. That is, the cable holding portion 332 holds the cable 5 so that the distance L2 in the main scanning direction between a position at which the cable holding portion 332 holds the lower end of the cable 5 in the width direction and the side wall 6$b$1 is longer than the distance L1 in the main scanning direction between a position at which the cable holding portion 332 holds the upper end of the cable 5 in the width direction and the side wall 6$b$1.

With this configuration, the tension at the lower end of the cable 5 in the width direction is higher than the tension at the upper end of the cable 5 in a part between a part, of the cable 5, fixed to the side wall 6$b$1 and a part, of the cable 5, held by the cable holding portion 332. As described above, when the tension at the lower end, of the cable 5, in the width direction is larger than the tension at the upper end, of the cable 5, in the width direction, a restoring force F is generated at the upper end of the cable 5 in the width direction. The restoring force F is a resultant force of the longitudinal component Fx and the upward component Fy of the cable 5.

That is, the relationship of the vertical force applied to a part between a part, of the cable 5, fixed to the side wall 6$b$1 in the longitudinal direction and a part, of the cable 5, held by the cable holding portion 332 is as follows. That is, the upward component Fy of the restoring force F as an upward force in the vertical direction is applied to the cable 5.

Further, a force Fg due to its own weight of the cable 5 as a downward force in the vertical direction is applied. The inclination angle of the insertion slot 332a of the cable holding portion 332 is set so that the relationship of Fy=Fg is satisfied as much as possible. Here, the inclination angle of the insertion slot 332a of the cable holding portion 332 with respect to the vertical direction is desirably 5 degrees to 20 degrees.

As described above, by applying the upward force in the vertical direction to the cable 5 by the cable holding portion 332, it is possible to suppress hanging down of the cable 5 due to gravity. Therefore, as shown in FIG. 8, a contact between the cable 5 and a bottom face 6b3 of the lower housing 6b is suppressed, and it is possible to suppress disconnection of the cable 5 and malfunction of the image reading unit 3.

Next, the effect of the configuration of the present embodiment will be described in comparison with the configuration of a reader 500 according to the comparative example in which the insertion slot 332a of the cable holding portion 332 extends in the vertical direction. FIG. 9A is a sectional view of the reader 500 according to the comparative example taken along line K1-K1 in FIG. 1. FIG. 9B is a sectional view of the reader 500 according to the comparative example taken along line K2-K2 in FIG. 1.

As shown in FIG. 9A, in the configuration of the comparative example, the relationship between the distances L1 and L2 satisfies L1=L2 because the insertion slot 332a of the cable holding portion 332 is not inclined with respect to the vertical direction. In this case, since the tension at the upper end of the cable 5 in the width direction and the tension at the lower end of the cable 5 in the width direction are equal, the restoring force F does not occur. That is, considering the relationship of the vertical force applied to the cable 5, the upward force in the vertical direction is not applied, and only the force Fg due to the own weight of the cable 5 as the downward force in the vertical direction is applied. Therefore, as shown in FIG. 9B, the cable 5 hangs down and comes into contact with the bottom face 6b3 of the lower housing 6b. On the other hand, according to the configuration of the present embodiment, it is possible to keep the cable 5 from hanging down as described above.

Second Embodiment

Next, a second embodiment of an image forming apparatus including the image reading apparatus according to the present invention will be described with reference to the drawings. Parts that are the same as in the first embodiment will be denoted by the same drawings and the same reference numerals, and description thereof will be omitted.

Figure 10:
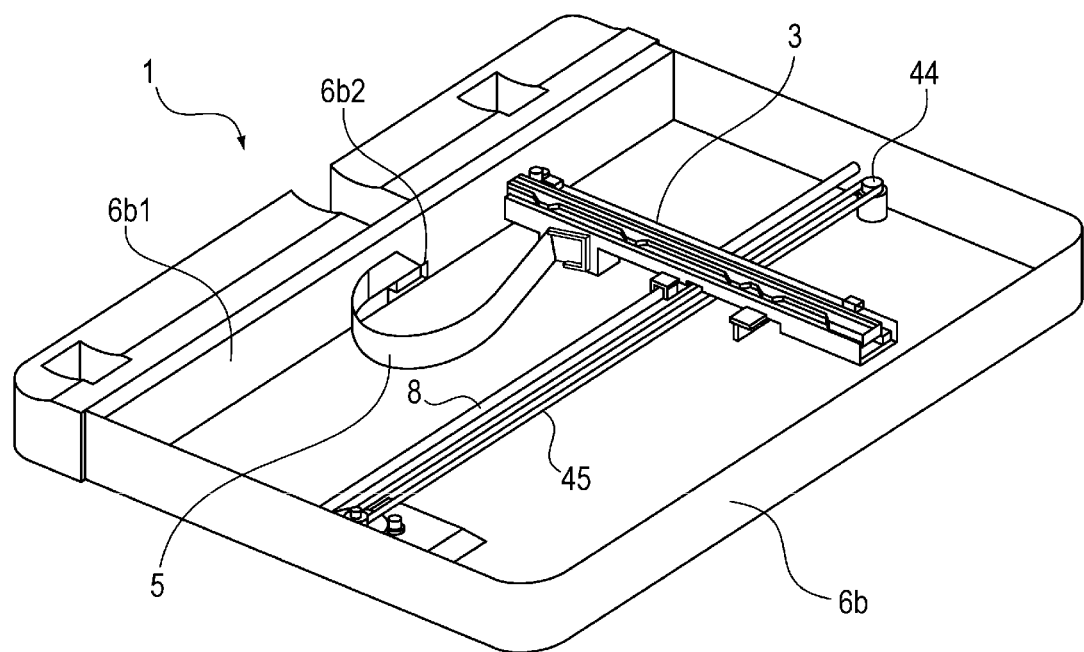
FIG. 10 is a perspective view of the reader.
Figure 11:
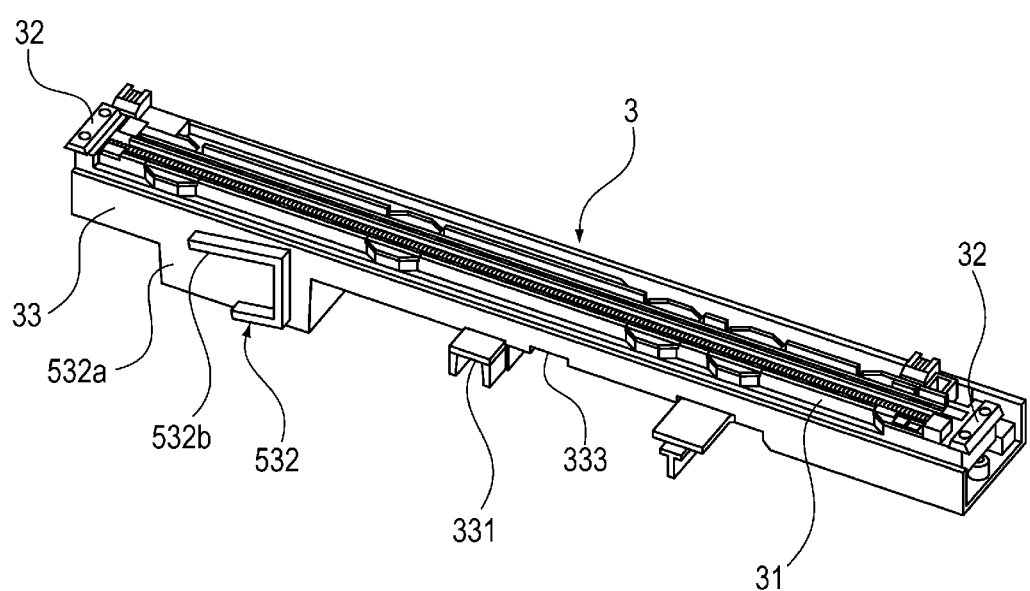
FIG. 11 is a perspective view of the image reading unit.

FIG. 10 is a perspective view of the reader 1 according to the present embodiment. FIG. 11 is a perspective view of the image reading unit 3 according to the present embodiment. As shown in FIGS. 10 and 11, the configuration of the present embodiment is the same as that of the first embodiment except the configuration of the cable holding portion of the image reading unit 3 included in the reader 1.

Figure 12A:
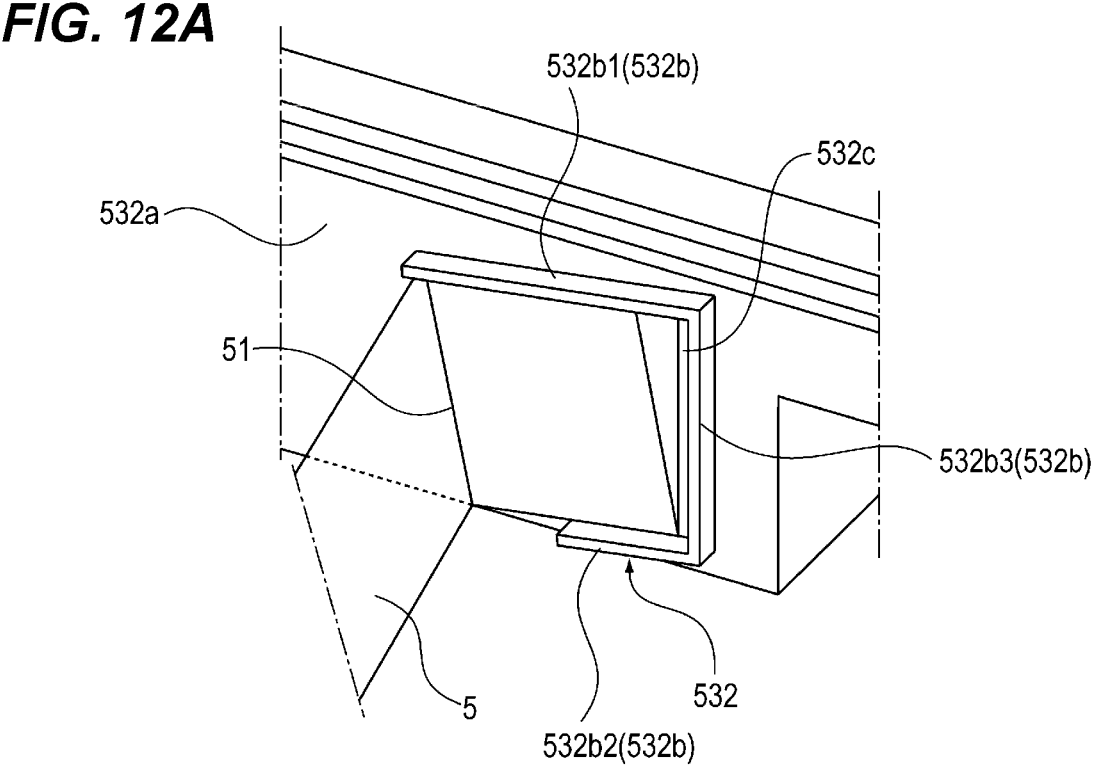
FIGS. 12A and 12B are a perspective view and a front view of the cable holding portion.
Figure 12B:
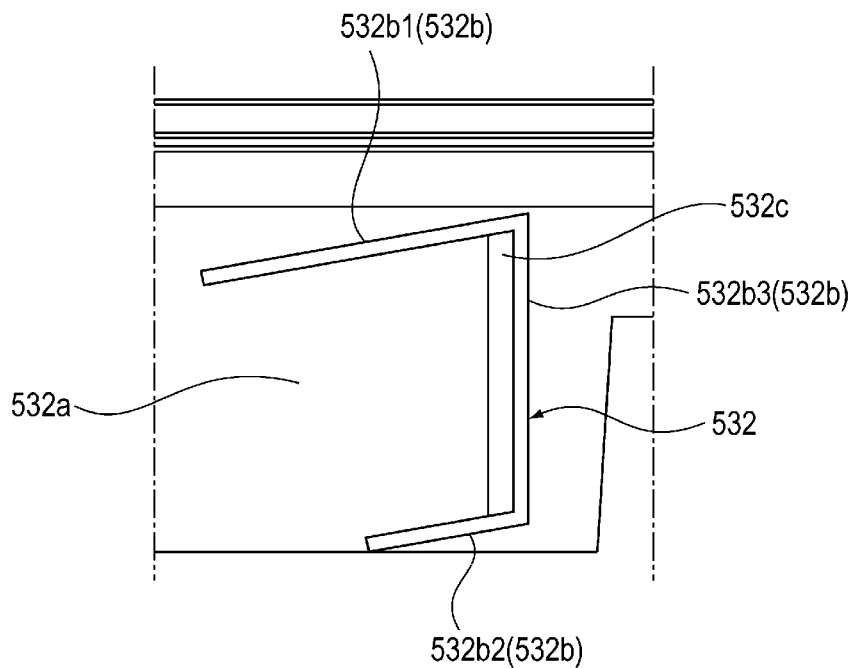

FIG. 12A is a perspective view of a cable holding portion 532 of the image reading unit 3 according to the present embodiment. FIG. 12B is a front view of the cable holding portion 532. As shown in FIGS. 12A and 12B, the cable holding portion 532 has an adhering face 532a to which the cable 5 is adhered, a positioning plate 532b that determines the adhering position, of the adhering face 532a, at which the cable 5 is adhered, and an insertion slot 532c into which the cable 5 is inserted.

The cable 5 is adhered to the adhering face 532a with a double-sided tape (not shown). At the contact position between the cable 5 and the adhering face 532a, the entire area of the cable 5 may be adhered to the adhering face 532a, or the partial area of the cable 5 may be adhered to the adhering face 532a. The insertion slot 532c is a hole formed in the adhering face 532a, and is a hole extending along the vertical direction. The cable 5 inserted into the insertion slot 532c enters the holder 33 and is connected to the electronic board on which the image reading sensor 31 is mounted.

The positioning plate 532b (positioning portion) is configured to protrude in a direction crossing the adhering face 532a. The positioning plate 532b has an upper positioning portion 532b1 that determines the adhering position of the upper end of the adhering face 532a in the width direction of the cable 5 and a lower positioning portion 532b2 that determines the adhering position of the lower end. The upper positioning portion 532b1 extends so as to change its position upward in the vertical direction as the distance from the side wall 6b1 increases. Similarly, the lower positioning portion 532b2 extends so as to change its position upward in the vertical direction as the distance from the side wall 6b1 increases. The upper positioning portion 532b1 and the lower positioning portion 532b2 are connected by a connecting portion 532b3.

FIG. 13A is a sectional view of the reader 1 taken along the line K1-K1 shown in FIG. 1. FIG. 13B is a sectional view of the reader 1 taken along the line K2-K2 shown in FIG. 1. As shown in FIG. 13A, the distance in the main scanning direction of the image reading unit 3 between a position at which the cable holding portion 532 holds the upper end of the cable 5 in the width direction and the side wall 6b1 is set to L1. Further, the distance in the main scanning direction of the image reading unit 3 between a position at which the cable holding portion 532 holds the lower end of the cable 5 in the width direction and the side wall 6b1 is set to L2.

At this time, the cable holding portion 532 holds the cable 5 so that the relationship of L1>L2 is satisfied. This is because since the upper positioning portion 532b1 and the lower positioning portion 532b2 extend so that their positions changes upward in the vertical direction as the distance from the side wall 6b1 increases, the relation of L1>L2 is satisfied when the rectangular parallelepiped cable 5 is adhered to the adhering face 532a. This embodiment has a configuration in which while the insertion slot 532c extends along the vertical direction, the cable 5 is inclined in a direction away from the side wall 6b1 of the lower housing 6b from the upper end to the lower end in the vertical direction, so that the cable 5 is less likely to interfere with the inner wall of the insertion slot 532c.

With such a configuration, the upward force in the vertical direction can be applied to the cable 5 by the cable holding portion 532 by the same mechanism as in the first embodiment. Therefore, as shown in FIG. 13B, it is possible to suppress hanging down of the cable 5 due to gravity and coming into contact with the bottom face 6b3 of the lower housing 6b, and it is possible to suppress disconnection of the cable 5 and malfunction of the image reading unit 3.

In addition, in the first embodiment and the second embodiment, although the configuration in which the controller board for processing the image data of the original is provided in the apparatus main body 50 of the image forming apparatus A has been described, the present invention is not limited to this. That is, even when the reader 1 is provided with the controller board, the same effect as described above can be obtained.

Further, in the first embodiment and the second embodiment, although the configuration in which the cable holding portions 332 and 532 are provided in the holder 33 that is the housing of the image reading unit 3 has been described, the present invention is not limited to this. That is, an electronic board is disposed at the end face of the image reading unit 3 in the sub-scanning direction, the image reading sensor 31 is mounted on the electronic board, and a connector to which the cable 5 is connected is provided on the electronic board. Then, the connecting part of the connector to which the cable 5 is connected is disposed so as to be inclined in the direction away from the side wall 6b1 of the lower housing 6b from the upper end to the lower end in the vertical direction, the same effect as above can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-128945, filed Jul. 11, 2019, which is hereby incorporated by reference herein in its entirety.

What is claimed is:

1. An image reading apparatus comprising:
   a housing;
   a transparent plate that is provided in an opening formed in an upper part of the housing and on which an original is placed;
   an image reading unit that is disposed inside the housing and that scans in a main scanning direction while moving in a sub-scanning direction to read an image of the original placed on the transparent plate;
   a flexible flat cable having one end that is connected to a control board and the other end that is connected to the image reading unit, the flexible flat cable being configured to electrically connect the image reading unit and the control board, the flexible flat cable being disposed such that a width direction of the flexible flat cable crosses a surface of the transparent plate on which the original is placed, the flexible flat cable being partially fixed to a side wall of the housing facing the image reading unit in the main scanning direction; and
   a holding portion configured to hold a part of the flexible flat cable, the holding portion holding the part between a part fixed to the side wall and the other end, of the flexible flat cable, the holding portion being formed on an end face of the image reading unit in the sub-scanning direction, wherein
   the holding portion holds the flexible flat cable such that a distance in the main scanning direction between a position at which the holding portion holds a lower end of the flexible flat cable in the width direction and the side wall is longer than a distance in the main scanning direction between a position at which the holding portion holds an upper end of the flexible flat cable in the width direction and the side wall.

2. The image reading apparatus according to claim 1, wherein the holding portion has an insertion slot into which the flexible flat cable is inserted, and the insertion slot is inclined in a direction away from the side wall from an upper end to a lower end in a vertical direction.

3. The image reading apparatus according to claim 1, wherein
   the holding portion includes an adhering face to which the flexible flat cable is adhered, a positioning portion that protrudes in a direction crossing the adhering face and that determines an adhering position of the lower end of the flexible flat cable in the width direction with respect to the adhering face, and an insertion slot that is formed on the adhering face and into which the flexible flat cable is inserted, and wherein
   the positioning portion extends such that a position of the positioning portion changes upward in a vertical direction as a distance from the side wall increases.

4. An image forming apparatus comprising:
   an image reading apparatus; and
   an image forming portion that forms, on a sheet, an image of an original read by the image reading apparatus,
   the image reading apparatus comprising:
   a housing;
   a transparent plate that is provided in an opening formed in an upper part of the housing and on which an original is placed;
   an image reading unit that is disposed inside the housing and that scans in a main scanning direction while moving in a sub-scanning direction to read an image of the original placed on the transparent plate;
   a flexible flat cable having one end that is connected to a control board and the other end that is connected to the image reading unit, the flexible flat cable being configured to electrically connect the image reading unit and the control board, the flexible flat cable being disposed such that a width direction of the flexible flat cable crosses a surface of the transparent plate on which the original is placed, the flexible flat cable being partially fixed to a side wall of the housing facing the image reading unit in the main scanning direction; and
   a holding portion configured to hold a part of the flexible flat cable, the holding portion holding the part between a part fixed to the side wall and the other end, of the flexible flat cable, the holding portion being formed on an end face of the image reading unit in the sub-scanning direction, wherein
   the holding portion holds the flexible flat cable such that a distance in the main scanning direction between a position at which the holding portion holds a lower end of the flexible flat cable in the width direction and the side wall is longer than a distance in the main scanning direction between a position at which the holding portion holds an upper end of the flexible flat cable in the width direction and the side wall.

5. The image reading apparatus according to claim 1, wherein
   the control board has an electronic component that is configured to process the image read by the image reading unit.

6. The image forming apparatus according to claim 4, wherein
   the control board has an electronic component that is configured to process the image read by the image reading unit.

* * * * *